US009001238B1

(12) United States Patent
Chen et al.

(10) Patent No.: US 9,001,238 B1
(45) Date of Patent: Apr. 7, 2015

(54) LENS SHADING CORRECTION METHOD AND IMAGE SIGNAL PROCESSOR FOR PERFORMING THE SAME

(71) Applicant: Himax Imaging Limited, Tainan (TW)

(72) Inventors: Po-Chang Chen, Tainan (TW); Yuan-Chih Peng, Tainan (TW); Kuan-Hua Chen, Tainan (TW)

(73) Assignee: Himax Imaging Limited, Tainan (TW)

( * ) Notice: Subject to any disclaimer, the term of this patent is extended or adjusted under 35 U.S.C. 154(b) by 0 days.

(21) Appl. No.: 14/027,620

(22) Filed: Sep. 16, 2013

(51) Int. Cl.
*H04N 9/64* (2006.01)
*G06K 9/40* (2006.01)
*H04N 5/357* (2011.01)

(52) U.S. Cl.
CPC .................................. *H04N 5/3572* (2013.01)

(58) Field of Classification Search
CPC .............................. H04N 5/3572; G06T 5/006
USPC ................................... 348/251; 382/274, 275
See application file for complete search history.

(56) References Cited

U.S. PATENT DOCUMENTS

| 2005/0179793 A1* | 8/2005 | Schweng ..................... 348/251 |
| 2008/0043117 A1* | 2/2008 | Kim et al. ................. 348/224.1 |
| 2009/0219419 A1* | 9/2009 | Kawasaka ..................... 348/251 |
| 2011/0007969 A1* | 1/2011 | Park et al. ..................... 382/167 |

* cited by examiner

*Primary Examiner* — Tuan Ho
*Assistant Examiner* — Selam Gebriel
(74) *Attorney, Agent, or Firm* — McClure, Qualey & Rodack, LLP (57) ABSTRACT

A lens shading correction method for pixels of an image is provided. The method includes the steps of: inputting coordinates of the pixels and setting a threshold range on the image; providing a first gain function and a second gain function, each relating the coordinates of the pixels to brightness gains; performing the first gain function on the pixels located at the interior of the threshold range for calculating the brightness gains; and performing a blended gain function on the pixels located at the exterior of the threshold range for calculating the brightness gains, wherein the blended gain function is the combination of the first gain function and the second gain function.

15 Claims, 8 Drawing Sheets

LENS SHADING CORRECTION METHOD AND IMAGE SIGNAL PROCESSOR FOR PERFORMING THE SAME

BACKGROUND OF THE INVENTION

1. Field of the Invention

The present invention relates to image signal processing techniques, and in particular relates to image signal processing techniques for reducing the lens shading phenomenon on images.

2. Description of the Related Art

In optical imaging, lens shading (vignetting) is a phenomenon that reduces the brightness of an image at a periphery thereof, as compared to the center of the image. This phenomenon is usually caused by defects in lens mechanism. For example, lens shading may occur when off-axis light beams projected onto the image sensors are partially blocked by objects such as filters, secondary lenses, and lens hoods. Physically, lens shading is mainly resulted due to the differences of the ray traveling distances between the pixels in the center and those at a periphery of the image.

The lens shading phenomenon is usually an undesired effect. Thus, the image signal method, called the lens shading correction (LSC) method, is used to compensate for the effect. In general, the purpose of the lens shading correction method is to adjust the brightness of an image to satisfy the following criteria: (1) the pixels with the maximum brightness are located at or around the image center; and (2) other pixels have a brightness which is not smaller than, for example, 0.8, times that of the maximum brightness.

Figure 1A:
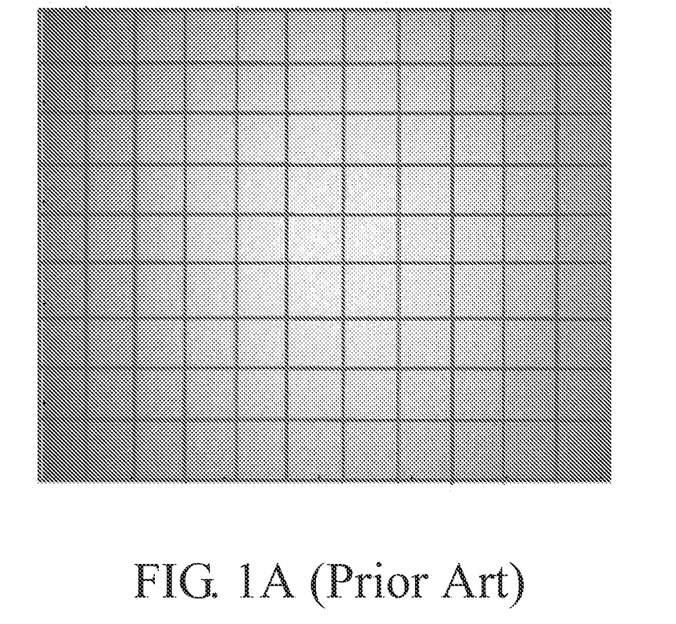
FIGS. 1A and 1B illustrate a Mesh Grid method of the prior art used for the lens shading correction method.
Figure 1B:
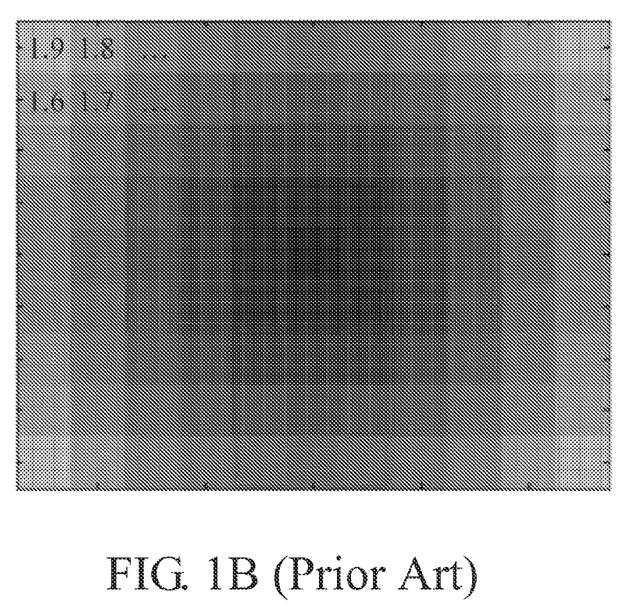

FIGS. 1A and 1B illustrate a Mesh Grid method of the prior art used for the lens shading correction method. In the Mesh Grid method, the whole image as shown in FIG. 1A is divided into numerous sub-areas, and each sub-area is given a gain value, such as 1.9, 1.8, 1.7 and 1.6, as shown in FIG. 1B, for tuning the brightness of the sub-areas, respectively. However, for an image having a great number of pixels, this method may require a significant amount of registers or memory units for storing the gain values and thus hardware implementation may be costly.

There is another method in the prior art for the lens shading correction method which uses a high-order polynomial for computing the gain value for each pixel of an image. The following shows an exemplary two-dimensional fourth-order polynomial $L_{gain}$ used in the method, which calculates a gain value for each pixel:

$$L_{gain} = A \times (x-x_c)^4 + B \times (x-x_c)^3 + C \times (x-x_c)^2 + D \times (x-x_c) + E \times (y-y_c)^4 + F \times (y-y_c)^3 + G \times (y-y_c)^2 + H \times (y-y_c) + I + C_{11}(x-x_c)^3(y-y_c) + C_{12}(x-x_c)^2(y-y_c)^2 + C_{13}(x-x_c)(y-y_c)^3 C_{14}(x-x_c)^2(y-y_c) + C_{15}(x-x_c)(y-y_c)^2 + C_{16}(x-x_c)(y-y_c),$$

where (x, y) represents the Cartesian coordinates of a pixel, $(x_c, y_c)$ represents the center of the polynomial, and A, B, C, D, E, F, G, H, I and $C_{1j}$, j=1-6 are given coefficients of the polynomial. It is noted that, although, by using this high-order polynomial, this method may produce much more accurate gain values for the pixels, calculation is quite complicated and hardware implementation is still costly.

Also, sometimes, in the prior art, a low-order polynomial is used for gain computation for the lens shading correction method. However, in many applications where the relative illumination (RI) of an image, that is, the ratio of the brightness in the corner to that of the center of the image, is lower than 30%, the method often fails to satisfy the criteria for adjusting the brightness of the image

BRIEF SUMMARY OF THE INVENTION

A detailed description is given in the following embodiments with reference to the accompanying drawings.

The present invention provides a lens shading correction method for pixels of an image, comprising the steps of: setting a threshold range on the image; providing a first gain function and a second gain function, each relating the coordinates of the pixels to brightness gains; performing the first gain function on the pixels located at the interior of the threshold range for calculating the brightness gains; and performing a blended gain function on the pixels located at the exterior of the threshold range for calculating the brightness gains, wherein the blended gain function is the combination of the first gain function and the second gain function.

The present invention also provides an image signal processor for performing lens shading correction on pixels of an image, comprising: a setting unit, for setting a threshold range on the image; a gain function generating unit, for generating a first gain function and a second gain function, each relating the coordinates of the pixels to brightness gains; a calculation unit, coupled to the gain function generating unit and the setting unit, for performing the first gain function on the pixels located at the interior of the threshold range for calculating the brightness gains, and performing a blended gain function on the pixels located at the exterior of the threshold range for calculating the brightness gains, wherein the blended gain function is the combination of the first gain function and the second gain function.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 2:
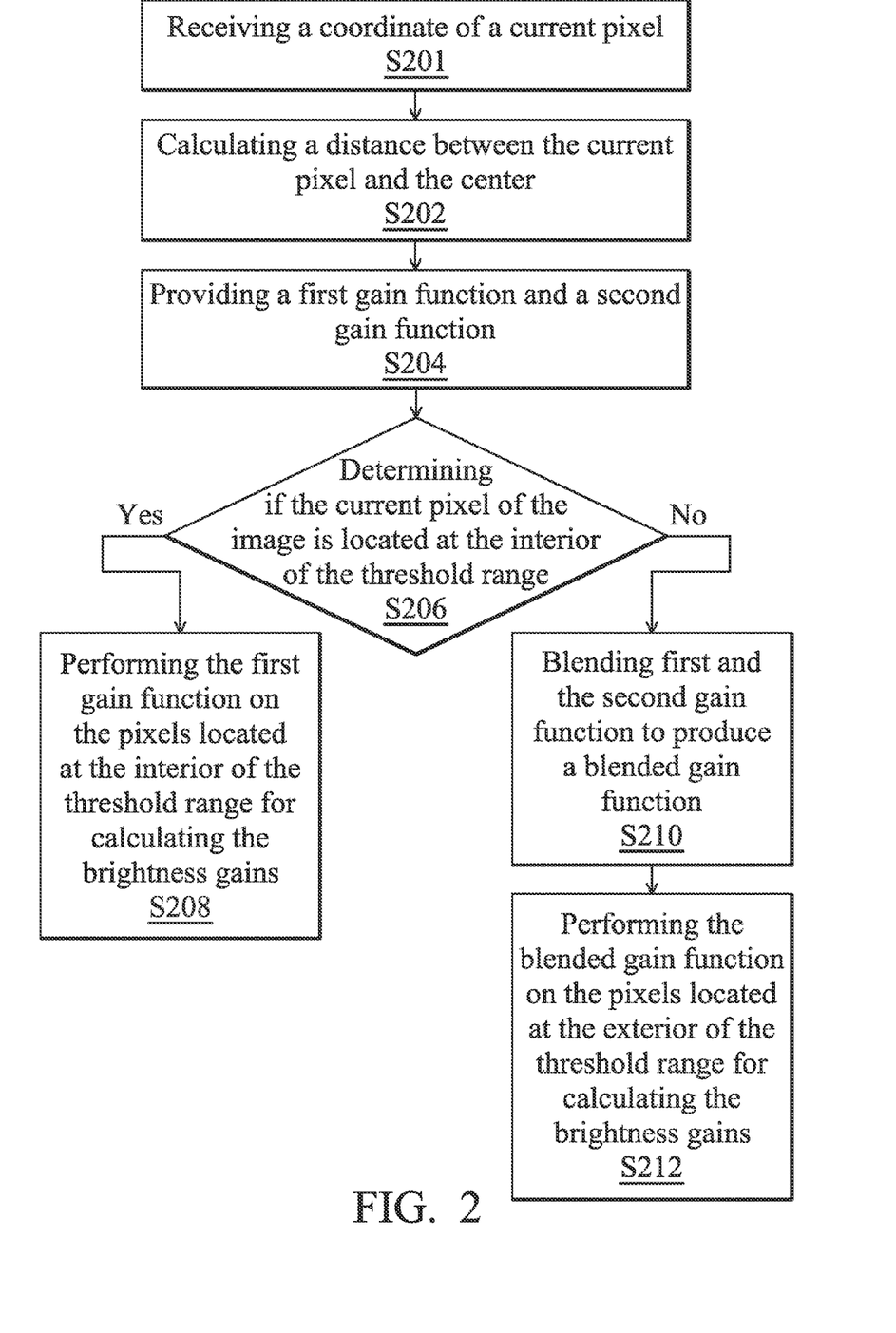
FIG. 2 is a flowchart of a lens shading correction method according to an embodiment of the present invention.

FIG. 2 is a flowchart of a lens shading correction method according to an embodiment of the present invention. The lens shading correction method of the present invention is used to compensate for the lens shading phenomenon for pixels of an image. The lens shading correction method of the embodiment comprises: receiving a coordinate of a current pixel in step S201, and calculating a distance between the current pixel and the center in step S202; providing a first gain function and a second gain function, each relating the coordinates of the pixels to brightness gains, in step S204; determining if the current pixel of the image is located at the interior of the threshold range in step S206; if yes, performing the first gain function on the pixel (which is located at the interior of the threshold range) for calculating brightness gain in step S208; and if no, blending the first and the second gain function to produce a blended gain function in step S210; and performing the blended gain function to the pixel (which is located at the exterior of the threshold range) for calculating brightness gain in step S212. By applying the method to every pixel of the image, and updating the pixels of the image with the newly calculated brightness gain, the embodiment of the present invention greatly reduces the lens shading phenomenon of the image. These steps will be further discussed in detail in the following preferred embodiments.

Method-Embodiment 1

Figure 3A:
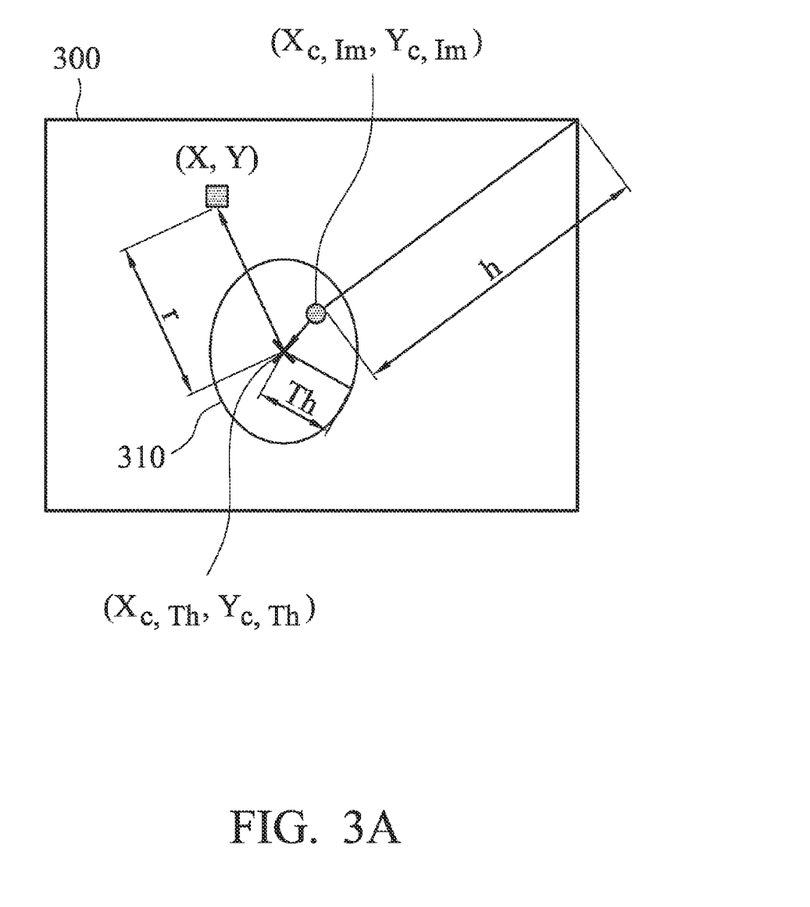
FIG. 3A shows an image in an embodiment where the lens shading correction method of the present invention is performed.

FIG. 3A shows an image where the lens shading correction method of the embodiment is performed. The rectangle image 300 has a center, i.e., image center, with coordinates ($X_{c, Im}$, $Y_{c, Im}$) and is composed of a plurality of pixels with coordinates (x, y). The method sets a threshold range 310 on the image 300 to divide the image 300 into two areas, an interior and an exterior area, in order to provide the basis for brightness gain calculation. In this preferred embodiment, the threshold range 310 is in the form of a circle, which has a radius Th and a center, i.e., circle center, with coordinates ($X_{c,Th}$, $Y_{c,Th}$) around the image center ($X_{c, Im}$, $Y_{c, Im}$). The circle center ($X_{c,Th}$, $Y_{c,Th}$) may be the center of lens shading. Note that although the present method uses a circle as the threshold range for illustration, the threshold range 310 should not be limited thereto and can be in various forms in other embodiments. In step 201, a coordinate of a current pixel is received. Next, in step 202, the distance between the current pixel and the circle center is calculated. The distance "r" between the pixel (X,Y) and the circle center ($X_{c,Th}$, $Y_{c,Th}$), can be obtained as follows:

$$r = \sqrt{(X-X_{c,Th})^2 + (Y-Y_{c,Th})^2}$$

Figure 3B:
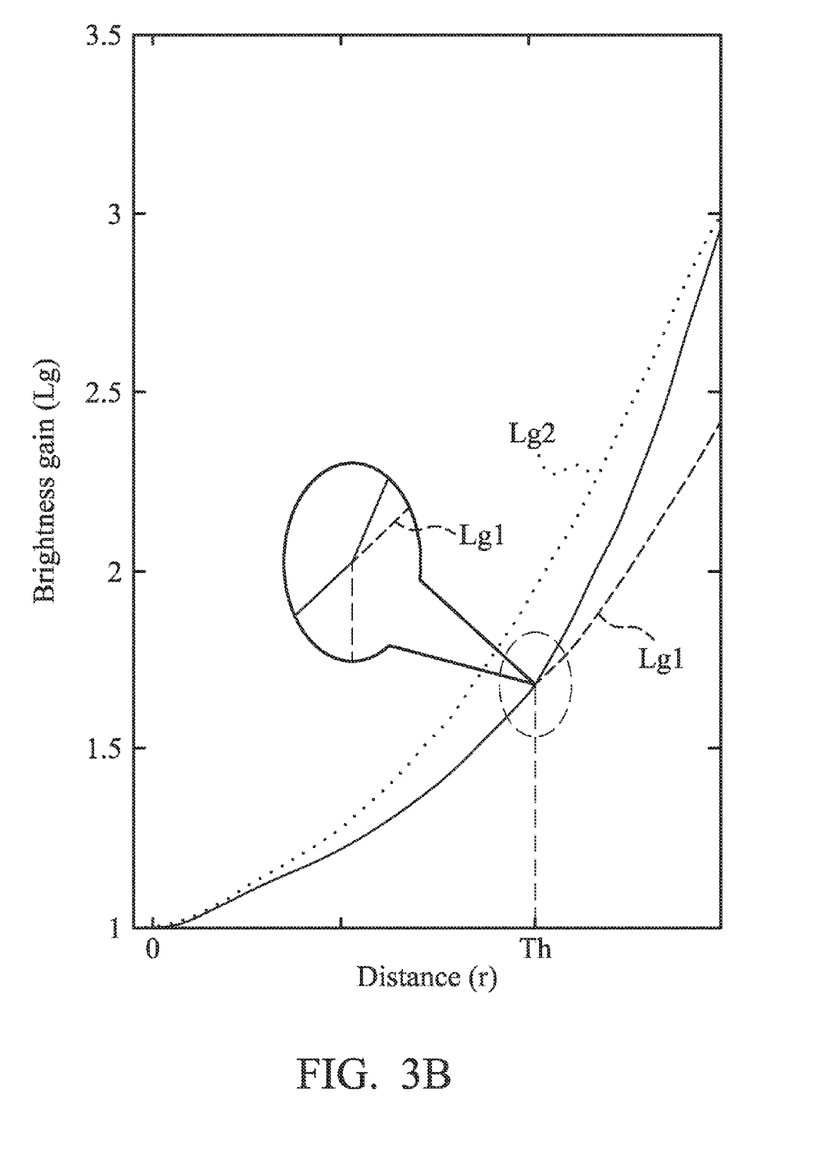
FIG. 3B shows the graphs of the first gain function and the second gain function.

Next in steps S204-S212, a gain of the current pixel is calculated based on the distance r, a first gain function (function 1) and a second gain function (function 2). In step 204, a first gain function (function 1) and a second gain function (function 2) are provided. The first and the second gain functions are both, for example, second-order polynomial functions with given coefficients, as follows:

$L_g1 = a1 \times r^2 + a2 \times r + a3$ (function 1); and $L_g2 = b1 \times r^2 + b2 \times r + b3$ (function 2), wherein "$L_{g1}$" and "$L_{g2}$" denote the brightness gain of a pixel which is spaced from the circle center ($X_{c,Th}$, $Y_{c,Th}$) with a distance "r", and "a1-a3" and "b1-b3" are the given coefficients of the functions. FIG. 3B shows the graphs of the first gain function $L_{g1}$ and the second gain function $L_{g2}$, respectively, in dashed and dotted lines (and a blended gain function in a solid line which will be discussed later), defining the relationship between the brightness gain "$L_g$" and the distance "r" between the pixel (X,Y) and the circle center ($X_{c,Th}$, $Y_{c,Th}$). In this embodiment, coefficients of the two gain functions can be predetermined or dynamically adjusted by an image processor according to the operation condition changes, such as changes in the luminance or color temperature of illumination. As shown in FIG. 3B, the first and the second gain functions have the same brightness gain for the pixel located at the circle center ($X_{c,Th}$, $Y_{c,Th}$).

In step S206, the method proceeds to determine if the current pixel (X, Y) of the image 300 is located at the interior of the threshold range. Specifically, in this step S206, the distance "r" between the pixel (X, Y) and the circle center ($X_{c,Th}$, $Y_{c,Th}$) is further compared with the radius "Th" of the circle 310. Then, if the determination result in step S206 is "yes" (r<Th), the method proceeds to step S208 to perform the first gain function ($L_{g1} = a1 \times r^2 + a2 \times r + a3$) on the pixel for calculating brightness gain, and otherwise, if the determination result in step S206 is "no" (r>Th), the method of the present invention proceeds to step S210 to produce a blended gain function, and further to step S212 to perform the blended gain function on the pixel for calculating brightness gain. The blended gain function can be obtained in the so-called blending procedure (step S210) by arithmetically combining the first gain function and the second gain function. In this preferred embodiment, the blended gain function is the sum of the first gain function ($L_{g1} = a1 \times r^2 + a2 \times r + a3$) times a first coefficient $\beta(r)$ and the second gain function ($L_{g2} = b1 \times r^2 + b2 \times r + b3$) times a second coefficient $\alpha(r)$. The first coefficient $\beta(r)$ may be one (i.e., 1) subtracted by the second coefficient $\alpha(r)$. The steps S206, S208, S210 and S212 can be expressed together as follows:

if r<Th, then, $L_g = L_{g1} = a1 \times r^2 + a2 \times r + a3$; and if r>Th, then, $L_g = L_{g,blend} = \alpha(r) \times L_g2 + \beta(r) \times L_g1 = \alpha(r) \times L_g2 + (1-\alpha(r)) \times L_g1$.

The essence of the blending procedure (step S210) is to find the second coefficient $\alpha(r)$ for the pixel. The second coefficient $\alpha(r)$ can be calculated using the following equations:

$$\alpha(r) = \left| \frac{r - Th}{d - Th} \right|;$$

and $$d = h + \sqrt{(X_{c,Th} - X_{c,Im})^2 + (Y_{c,Th} - Y_{c,Im})^2},$$

wherein, as shown in FIG. 3A, "Th" denotes the radius of the circle 310, "h" denotes the maximum distance between the center and the edge of the image 300 (in this embodiment, it is half the length of the diagonal of the image 300), and "d" equals to "h" plus the distance between the image center and the circle center. The second coefficient $\alpha(r)$ decreases to nearly zero when the pixel (in the exterior of the threshold range 310) is close to the edge of the threshold range 310, and increases to nearly one when the pixel is close to the edge of the image 300. Therefore, the blended gain function, as shown in FIG. 3B, is a function that "blends" with much more of the first function than the second function when the pixel is closer to the edge of the threshold range, and "blends" with much more of the second function than the first function when the pixel is closer to the edge of the image. Through the discussed two-segment calculation (one for pixels in the interior of the threshold range using the first gain function, and another for pixels in the exterior of the threshold range using the blended gain function,) the brightness gains for all of the pixels of the image 300 can be appropriately obtained.

Method-Embodiment 2

In the above embodiment, however, as can be seen from the graph in FIG. 3B, the blended gain function slightly lacks a smooth transition when the pixel is around the r=Th, thus causing unnatural brightness variations in the image 300. Therefore, the present invention further provides another embodiment for performing the blending procedure (step S210). In this embodiment, except for the blending procedure (step S210), procedures in the other steps are the same with those previously described, where the threshold range is a circle (as shown in FIG. 3A), the distance "r" between a pixel and the circle center is: $r=\sqrt{(X-X_{c,Th})^2+(Y-Y_{c,Th})^2}$, and the first, the second and the blended gain function are, respectively: $L_{g1}=a1\times r^2+a2\times r+a3$, $L_{g2}=b1\times r^2+b2\times r+b3$, and $L_{g,blend}=\alpha(r)\times L_{g2}+\beta(r)\times L_{g1}=\alpha(r)\times L_{g2}+(1-\alpha(r))\times L_{g1}$. Similarly, this embodiment performs the first gain function on the pixels located at the interior of the threshold range in step S208, and performs the blended gain function on the pixels located at the exterior of the threshold range in step S212. However, the calculation for the second coefficient $\alpha(r)$ in step S210 of this embodiment is different. The second coefficient $\alpha(r)$ in this embodiment is calculated using the following equations:

$$\alpha(r)=\left|\frac{r^2-Th^2}{d^2-Th^2}\right|;$$

and $$d^2=h^2+(X_{c,Th}-X_{c,Im})^2+(Y_{c,Th}-Y_{c,Im})^2.$$

Figure 4:
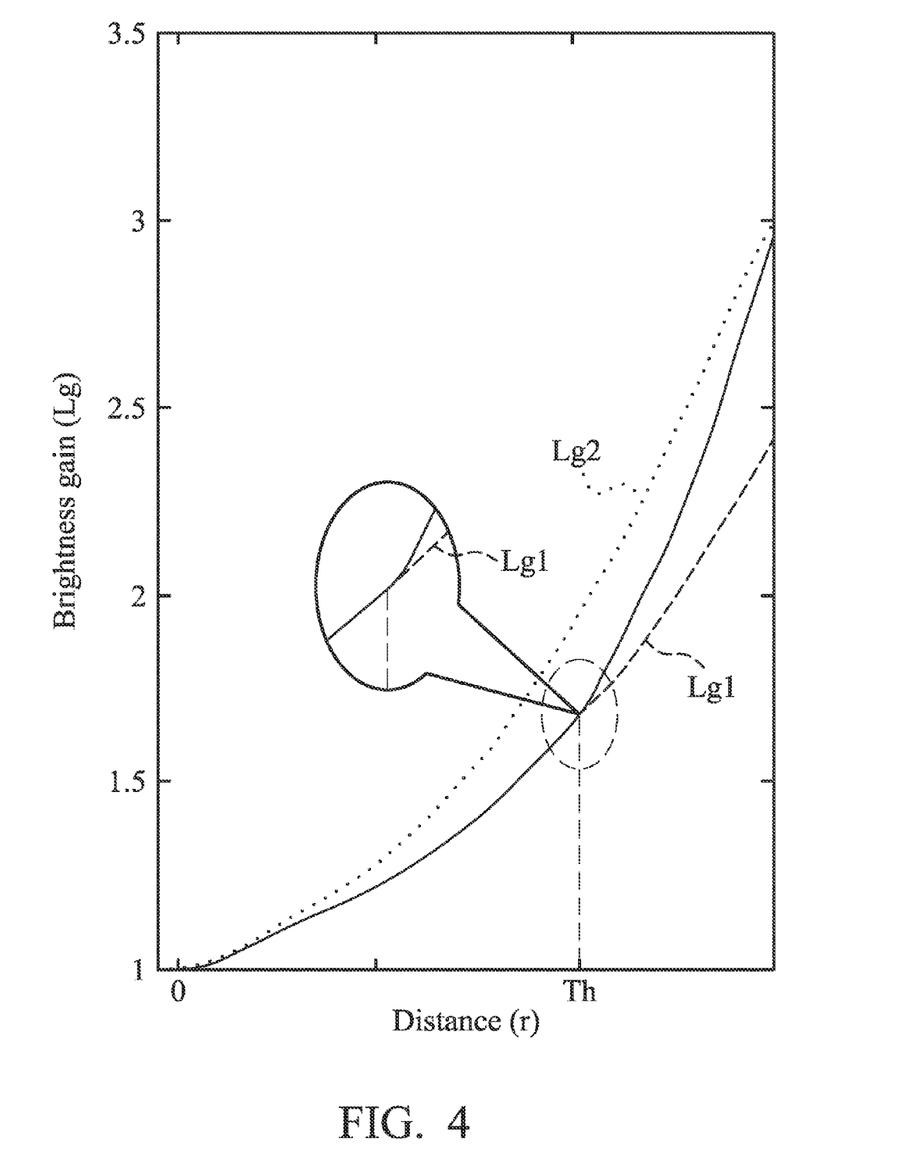
FIG. 4 shows the graph of the blended gain function of this embodiment.

FIG. 4 shows the graph of the blended gain function of this embodiment. Comparing the graph in FIG. 4 with that in FIG. 3A, it is found that the blended gain function of this embodiment has a much smoother transition when the pixel is around r=Th than that of the embodiment mentioned previously.

Method-Embodiment 3

Although both of the above two embodiments uses a circular threshold range, the threshold range can be in various forms if supported by proper calculations. For example, the threshold range 310 can be in the form that is the intersection of a cone with a plane, such as an ellipse, a parabola, or half of a hyperbola. This embodiment has the same steps as the preceding embodiments where the distance "r" between a pixel and the center of the threshold range is: $r=\sqrt{(X-X_{c,Th})^2+(Y-Y_{c,Th})^2}$, and the first, the second and the blended gain function are, respectively: $L_{g1}=a1\times r^2+a2\times r+a3$, $L_{g2}=b1\times r^2+b2\times r+b3$, and $L_{g,blend}=\alpha(r)\times L_{g2}+\beta(r)\times L_{g1}=\alpha(r)\times L_{g2}+(1-\alpha(r))\times L_{g1}$, however, an auxiliary parameter $G_{aux}$ is introduced to the first gain function in step S208 and the blended gain function in step S212. The steps S206, S208, S210 and S212 in this embodiment can be expressed together as follows:

if r<Th, then, $$L_g=L_{g1}+G_{aux}=a1\times r^2+a2\times r+a3+G_{aux}, \text{ and}$$

$$G_{aux}=c1\times(X-X_{c,Th})+c2\times(Y-Y_{c,Th}); \text{ and}$$

if r>Th, then, $$L_g=L_{g,blend}+G_{aux}=\alpha(r)\times L_{g2}+(1-\alpha(r))\times L_{g1}+G_{aux},$$

wherein "c1" and "c2" are given coefficients.

Although the three embodiments are described for illustrating the lens shading method of the present invention, the present invention should not be limited thereto and it should be appreciated by one skilled in the art that the present method can be implemented by using proper mathematical models.

<<Apparatus>>

Figure 5:
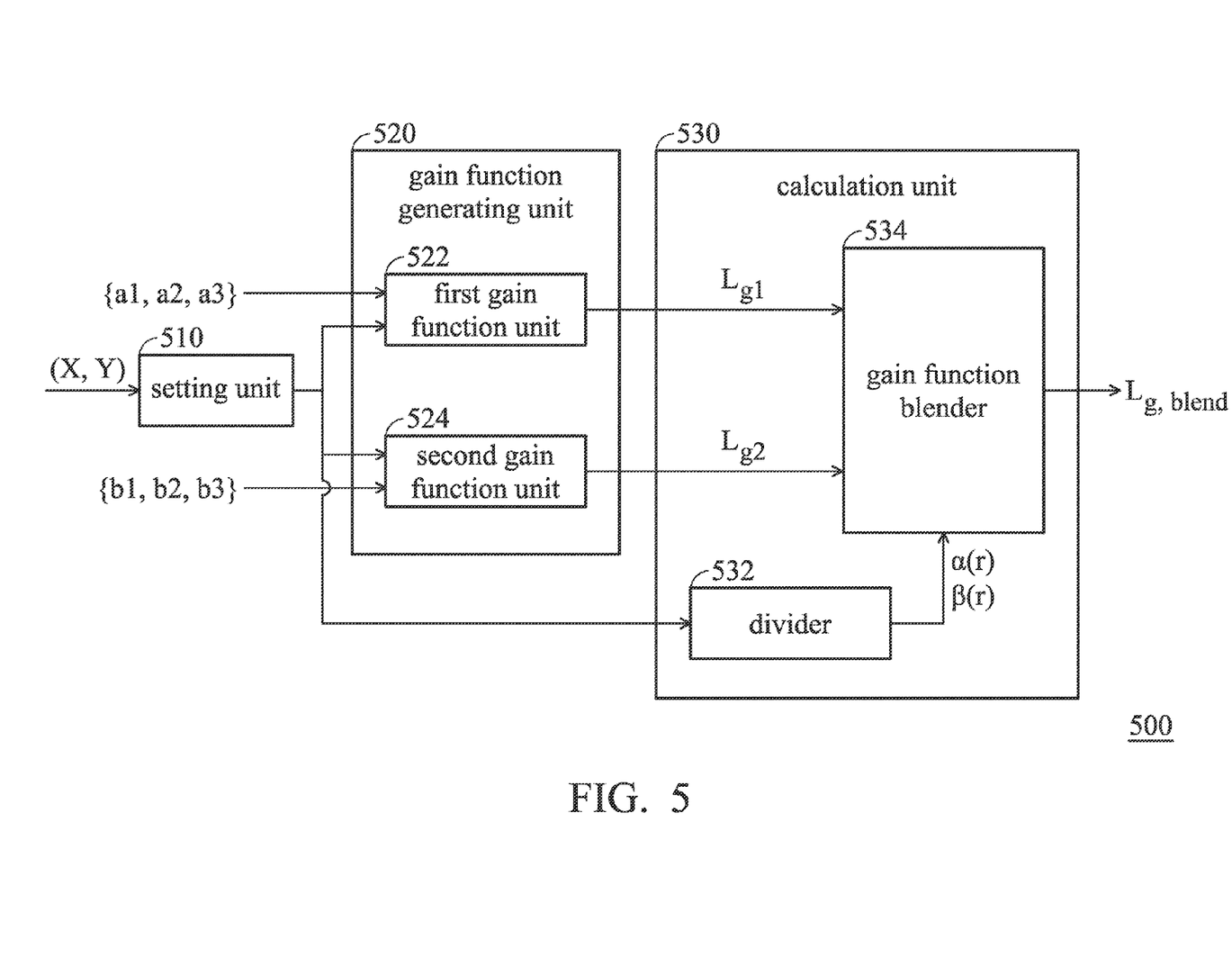
FIG. 5 is a schematic diagram of the image signal processor according to an embodiment of the present invention.

In addition to the lens shading method, the present invention further provides an image signal processor for performing the lens shading correction method for pixels of an image. FIG. 5 is a schematic diagram of the image signal processor according to an embodiment of the present invention. The image signal processor 500 is used for performing the lens shading correction method, as described in the above embodiments, on pixels of an image, and comprises a setting unit 510, a gain function generating unit 520, and a calculation unit 530. Specifically, the setting unit 510 receives coordinates of the current pixel and calculating a distance r between the current pixel and the center. The gain function generating unit 520 calculates a first gain Lg1 and a second gain Lg2 based on the distance r and the parameters a1, a2 a3, b1, b2, and b3, which comprises a first gain function unit 522 and a second gain function unit 524 for generating a first gain $L_{g1}$ and a second gain $L_{g2}$. The calculation unit 530, coupled to the setting unit 510 and the gain function generating unit 520, is used for determining if the current pixel of the image is located at the interior of the threshold range (step S206), if yes, the first gain $L_{g1}$ is used on the current pixel located at the interior of the threshold range as the brightness gains, and if no, the first and the second gain $L_{g1}$ and $L_{g2}$ are blended with each other to produce a blended gain and the blended gain function is performed on the current pixel located at the exterior of the threshold range as the brightness gain. The calculation unit 530 may further comprise a divider 532 and a gain function blender 534. The divider 532 is used for generating a first coefficient (i.e., $\beta(r)$ in the previous embodiments) and a second coefficient (i.e., $\alpha(r)$ in the previous embodiments) based on the threshold range, where the first coefficient may be one subtracted by the second coefficient (i.e., $\beta(r)=1-\alpha(r)$), and the second coefficient varies between zero and one according to the distance between the pixels and the boundary of the threshold range. The gain function blender 534 is used for calculating the sum of the first gain, which multiplied by a first coefficient, and the second gain, which is multiplied by a second coefficient (i.e., calculating the blended gain function $L_{g,blend}$, where $L_{g,blend}=\alpha(r)\times L_{g2}+\beta(r)\times L_{g1}=\alpha(r)\times L_{g2}+(1-\alpha(r))\times L_{g1}$). Specifically, in an embodiment similar to Embodiment 1, when the threshold range is a circle with a center and a radius, the divider 532 may generate the second coefficient $\alpha(r)$ by using the following equations:

$$\alpha(r)=\left|\frac{r-Th}{d-Th}\right|,$$

$r=\sqrt{(X-X_{c,Th})^2+(Y-Y_{c,Th})^2}$, and $d=h+\sqrt{(X_{c,Th}-X_{c,Im})^2+(Y_{c,Th}-Y_{c,Im})^2}$; or, in another embodiment similar to Embodiment 2, by using the following equations:

$$\alpha=\left|\frac{r^2-Th^2}{d^2-Th^2}\right|,$$

$r^2=(X-X_{c,Th})^2-(Y-Y_{c,Th})^2$, and $d^2=h^2+(X_{c,Th}-X_{c,Im})^2+(Y_{c,Th}-Y_{c,Im})^2$ (wherein (X,Y) represents the coordinates of the pixels, $(X_{c,Th}, Y_{c,Th})$ represents the coordinates of the center of the circle, $(X_{c,Im}, Y_{c,Im})$ represents the coordinates of the center of the image, h represents the maximum distance between the center and the edge of the image, and Th represents the radius of the circle). It should be noted that coefficients of the first and the second gain functions $L_{g1}$ and $L_{g2}$ (i.e., {a1, a2, a3} and {b1, b2, b3} as shown in FIG. 5) can be predetermined and stored in a memory (not shown) or dynamically adjusted by the image signal processor 500 according to operation condition changes, such as changes in the luminance or color temperature of illumination. Since the mathematical model in regard to the functions and the coefficients have been described in detail in the preceding embodiments of the present invention (Embodiments 1, 2 and 3), and those skilled in the art can understand the image signal processor 500 by reading descriptions of the embodiments, the image signal processor 500 of the present invention will not be further discussed.

Figure 6:
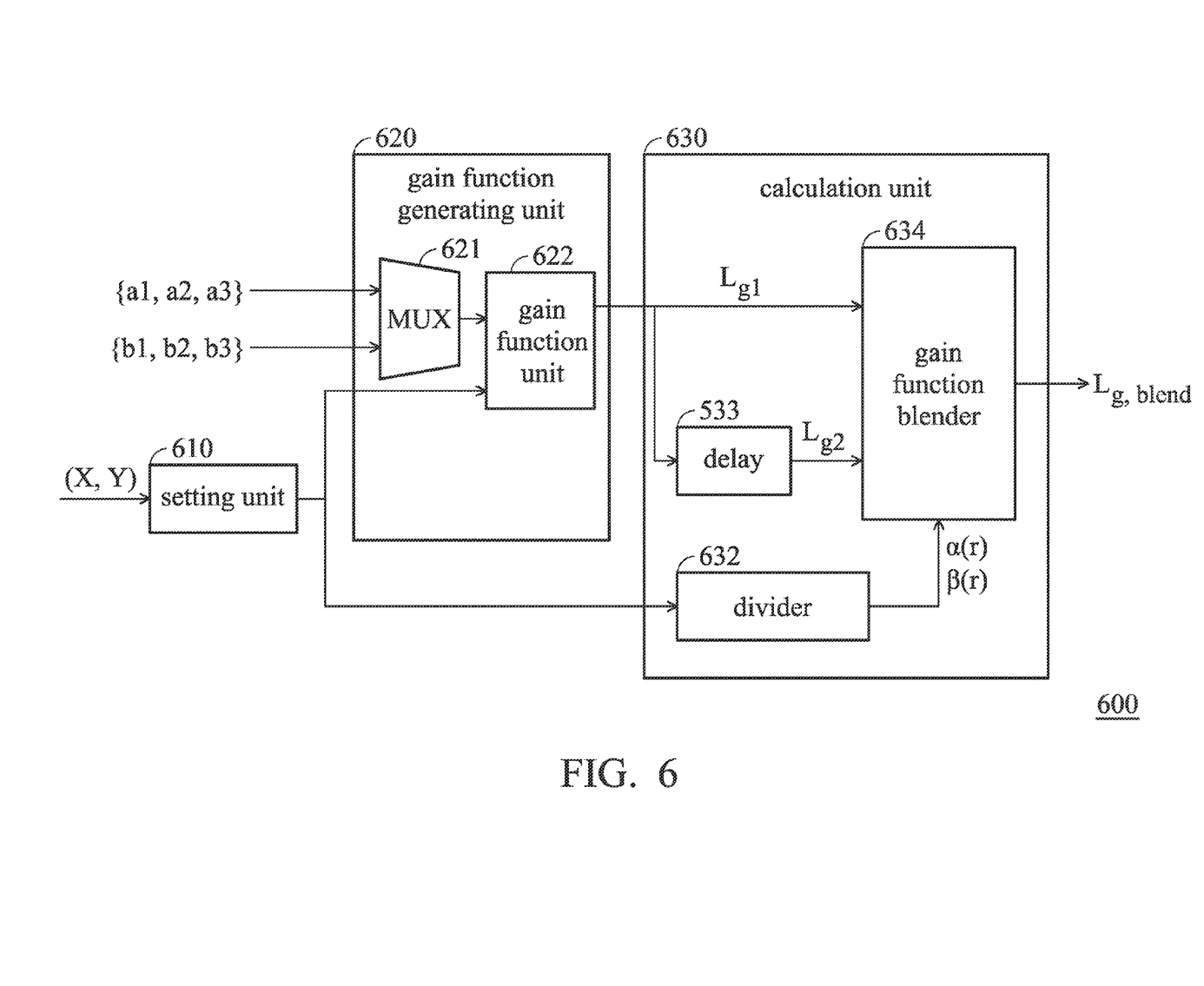
FIG. 6 is a schematic diagram of the image signal processor according to another embodiment of the present invention.

FIG. 6 is a schematic diagram of the image signal processor according to another embodiment of the present invention. The image signal processor 600 is used for performing the lens shading correction method on pixels of an image, and comprises a setting unit 610, a gain function generating unit 620, and a calculation unit 630. Specifically, the setting unit 610 receives coordinates of the current pixel and calculating a distance r between the current pixel and the center. The gain function generating unit 620 comprises a multiplexer 621 and a gain function unit 622. The gain function unit 622 receives the distance r and one of the parameter {a1, a2, a3} or the parameter {b1, b2, b3}, selected by the multiplexer 621, to selectively calculate the first gain Lg1 or second gain Lg2 based on the selected parameter. The calculation unit 530, coupled to the setting unit 510 and the gain function generating unit 520, is used for determining if the current pixel of the image is located at the interior of the threshold range, if yes, the first gain $L_{g1}$ is used on the current pixel located at the interior of the threshold range as the brightness gains, and if no, the first and the second gain $L_{g1}$ and $L_{g2}$ are blended with each other to produce a blended gain and the blended gain function is performed on the current pixel located at the exterior of the threshold range as the brightness gain. The calculation unit 630 may further comprise a divider 632, a delay 533 and a gain function blender 634. The divider 632 is used for generating a first coefficient (i.e., β(r) in the previous embodiments) and a second coefficient (i.e., α(r) in the previous embodiments) based on the threshold range, where the first coefficient may be one subtracted by the second coefficient (i.e., β(r)=1−α(r)), and the second coefficient varies between zero and one according to the distance between the pixels and the boundary of the threshold range. The delay 533 is used to pass the second gain Lg2 to the gain function blender 634 while the parameter {b1, b2, b3} is selected by the multiplexer 621. The gain function blender 634 is used for calculating the sum of the first gain Lg1 multiplied by a first coefficient, and the second gain Lg2 multiplied by a second coefficient (i.e., calculating the blended gain function $L_{g,blend}$, where $L_{g,blend}=\alpha(r) \times L_{g2}+\beta(r) \times L_{g1}=\alpha(r) \times L_{g2}+(1-\alpha(r)) \times L_{g1}$). The advantage of the image processor 600, compared with the image processor 500, is saving the hardware cost for using only one gain function unit 622, instead of two gain function units 522 and 524 of the image processor 500.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A lens shading correction method for pixels of an image, comprising the steps of:
   receiving a coordinate of a current pixel;
   setting a threshold range on the image;
   providing a first gain function and a second gain function, each relating the coordinates of the pixels to brightness gains;
   performing a first gain function on the current pixel located at the interior of the threshold range for calculating the brightness gain; and
   performing a blended gain function on the current pixel located at the exterior of the threshold range for calculating the brightness gains, wherein the blended gain function is the combination of the first gain function and the second gain function.

2. The lens shading correction method as claimed in claim 1, wherein the blended gain function comprises the sum of the first gain function, multiplied by a first coefficient, and the second gain function, multiplied by a second coefficient, wherein the first coefficient is one subtracted by the second coefficient, and the second coefficient varies between zero and one according to the distance between the pixels and the boundary of the threshold range.

3. The lens shading correction method as claimed in claim 2, wherein the threshold range is a circle with a center and a radius, and the second coefficient is calculated using the following equations:

$$\alpha(r) = \left| \frac{r - Th}{d - Th} \right|;$$

and $$r = \sqrt{(X-X_{c,Th})^2 + (Y-Y_{c,Th})^2}; \quad d = h + \sqrt{(X_{c,Th}-X_{c,Im})^2 + (Y_{c,Th}-Y_{c,Im})^2},$$

wherein (X,Y) denotes the coordinates of the pixels, $(X_{c,Th}, Y_{c,Th})$ denotes the coordinates of the center of the circle, $(X_{c,Im}, Y_{c,Im})$ denotes the coordinates of the center of the image, h denotes the maximum distance between the center and the edge of the image, and Th denotes the radius of the circle.

4. The lens shading correction method as claimed in claim 2, wherein the threshold range is a circle with a center and a radius, and the second coefficient is calculated using the following equations:

$$\alpha = \left| \frac{r^2 - Th^2}{d^2 - Th^2} \right|;$$

and $$r^2 = (X-X_{c,Th})^2 - (Y-Y_{c,Th})^2; \quad d^2 = h^2 + (X_{c,Th}-X_{c,Im})^2 + (Y_{c,Th}-Y_{c,Im})^2,$$

wherein (X,Y) represents the coordinates of the pixels, $(X_{c,Th}, Y_{c,Th})$ represents the coordinates of the center of the circle, $(X_{c,Im}, Y_{c,Im})$ represents the coordinates of the center of the image, h represents the maximum distance between the center and the edge of the image, and Th represents the radius of the circle.

5. The lens shading correction method as claimed in claim 1, wherein both of the first gain function and the second gain function is a second-order polynomial function with given coefficients.

6. The lens shading correction method as claimed in claim 1, further comprising: performing the first or the blended gain function on the pixels on the boundary of the threshold range.

7. An image signal processor for performing lens shading correction on pixels of an image, comprising:
  a setting unit, for inputting coordinates of the pixels and setting a threshold range on the image;
  a gain function generating unit, for generating a first gain function and a second gain function, each relating the coordinates of the pixels to brightness gains;
  a calculation unit, coupled to the gain function generating unit and the setting unit, for performing the first gain function on the pixels located at the interior of the threshold range for calculating the brightness gains, and performing a blended gain function on the pixels located at the exterior of the threshold range for calculating the brightness gains, wherein the blended gain function is the combination of the first gain function and the second gain function.

8. The image signal processor as claimed in claim 7, wherein the calculation unit further comprises:
  a divider, for generating a first coefficient and a second coefficient based on the threshold range, wherein the first coefficient is one subtracted by the second coefficient, and the second coefficient varies between zero and one according to the distance between the pixels and the boundary of the threshold range.

9. The image signal processor as claimed in claim 8, wherein the calculation unit further comprises:
  a gain function blender, for calculating the sum of the first gain function, multiplied by a first coefficient, and the second gain function, multiplied by a second coefficient.

10. The image signal processor as claimed in claim 9, wherein when the threshold range is a circle with a center and a radius, the divider generates the second coefficient by using the following equations:

$$\alpha(r) = \left| \frac{r - Th}{d - Th} \right|;$$

and $$r = \sqrt{(X - X_{c,Th})^2 + (Y - Y_{c,Th})^2}; \quad d = h + \sqrt{(X_{c,Th} - X_{c,Im})^2 + (Y_{c,Th} - Y_{c,Im})^2},$$

wherein (X,Y) denotes the coordinates of the pixels, $(X_{c,Th}, Y_{c,Th})$ denotes the coordinates of the center of the circle, $(X_{c,Im}, Y_{c,Im})$ denotes the coordinates of the center of the image, h denotes the maximum distance between the center and the edge of the image, and Th denotes the radius of the circle.

11. The image signal processor as claimed in claim 9, wherein the threshold range is a circle with a center and a radius, the divider generates the second coefficient by using the following equations:

$$\alpha = \left| \frac{r^2 - Th^2}{d^2 - Th^2} \right|;$$

and $$r^2 = (X - X_{c,Th})^2 - (Y - Y_{c,Th})^2; \quad d^2 = h^2 + (X_{c,Th} - X_{c,Im})^2 + (Y_{c,Th} - Y_{c,Im})^2,$$

wherein (X,Y) represents the coordinates of the pixels, $(X_{c,Th}, Y_{c,Th})$ represents the coordinates of the center of the circle, $(X_{c,Im}, Y_{c,Im})$ represents the coordinates of the center of the image, h represents the maximum distance between the center and the edge of the image, and Th represents the radius of the circle.

12. The image signal processor as claimed in claim 7, wherein coefficients of the first and the second gain functions can be predetermined and stored in a memory.

13. The image signal processor as claimed in claim 7, wherein coefficients of the first and the second gain functions can be dynamically adjusted by the image signal processor according to operation condition changes.

14. The image signal processor as claimed in claim 8, wherein the gain function generating unit further comprises:
  a multiplexer, for selecting a first set of parameters or a second set of parameters; and
  a gain function unit, for receiving the first and the second set of parameters from the multiplexer to selectively calculate a first gain of the first gain function or a second gain of the second gain function based on the selected set of parameters.

15. The image signal processor as claimed in claim 14, wherein the calculation unit further comprises:
  a delay, coupled between the gain function generating unit and the gain function blender, for passing the second gain to the gain function blender while the second set of parameters are selected.

\* \* \* \* \*